(12) United States Patent
Higgins et al.

(10) Patent No.: US 8,350,682 B2
(45) Date of Patent: Jan. 8, 2013

(54) DPF WARNING SYSTEM

(75) Inventors: John C. Higgins, Germansville, PA (US); David Keith Troupe, Kernersville, NC (US)

(73) Assignee: Mack Trucks, Inc., Greensboro, NC (US)

( * ) Notice: Subject to any disclaimer, the term of this patent is extended or adjusted under 35 U.S.C. 154(b) by 847 days.

(21) Appl. No.: 12/483,954

(22) Filed: Jun. 12, 2009

(65) Prior Publication Data
US 2010/0315213 A1    Dec. 16, 2010

(51) Int. Cl.
*B60Q 1/00* (2006.01)
*B60Q 1/26* (2006.01)
*F01N 3/00* (2006.01)

(52) U.S. Cl. ............... 340/425.5; 340/438; 340/468; 340/471; 340/472; 340/473; 60/274; 60/286; 60/295; 60/297

(58) Field of Classification Search ............... None
See application file for complete search history.

(56) References Cited

U.S. PATENT DOCUMENTS

| 3,775,743 | A  | * | 11/1973 | Carter | 340/905 |
| 7,168,244 | B2 | * | 1/2007  | Iizuka et al. | 60/295 |
| 7,421,837 | B2 | * | 9/2008  | Abe | 60/295 |
| 7,609,152 | B2 | * | 10/2009 | Crowe et al. | 340/461 |
| 7,611,567 | B2 | * | 11/2009 | Chiba et al. | 95/278 |
| 2009/0007549 | A1 | * | 1/2009 | Hagio et al. | 60/286 |
| 2009/0139211 | A1 | * | 6/2009 | Berke et al. | 60/277 |
| 2009/0179745 | A1 | * | 7/2009 | Okamoto et al. | 340/425.5 |

* cited by examiner

*Primary Examiner* — Julie Lieu
(74) *Attorney, Agent, or Firm* — Potomac Patent Group PLLC

(57) ABSTRACT

A system for providing external notification of a vehicle event to an operator includes a reader device connected to a control unit providing status of at least one vehicle condition with the vehicle having a diesel particulate filter (DPF), a plurality of warning devices connected to the reader device and a power supply connected to the reader device and to the warning devices wherein the reader device receives data via data lines from the control unit, decodes the received data to determine the occurrence of a vehicle event relating to the DPF and controls ground signal lines of the warning devices to trigger at least one of the warning devices based on the detection of a particular event.

20 Claims, 2 Drawing Sheets

DPF WARNING SYSTEM

BACKGROUND

This invention relates to trucks and more particularly, to systems that facilitate remote warnings of vehicle conditions of the trucks.

Typical tractor-type trucks are designed to tow trailers and semi-trailers having large loads that may include goods, supplies or other freight. Vocational trucks are designed to perform particular functions. Vocational trucks may include, for example, garbage trucks, cement mixers, concrete pumpers, etc.

Trucks with diesel engines could include a diesel particulate filter (DPF) for removing diesel particulate matter or soot from the exhaust gas. The particulate collects or accumulates on the filter.

The filter can be a disposable filter that can be replaced. The filter can also be cleaned (i.e. a non-disposable filter) by burning off the accumulated particulate matter in a process known as regeneration. Regeneration can be passive or active. Passive regeneration utilizes a catalyst which allows the particulate matter to oxidize at a lower temperature than it would otherwise. Active regeneration uses control of the engine or additional devices to heat the filter to very high temperatures at which the soot could burn off (i.e. combustion). Regeneration can take place when the accumulation of the particulate matter on the filter reaches a pre-determined level.

Active regeneration typically takes place in an automatic manner. A notification is provided that regeneration is about to take place within a predetermined period of time (in two minutes for example). Regeneration takes place at end of this period of time without operator action.

An operator, if the truck is so equipped, has the ability to override the automatic regeneration by activating an inhibit switch located within the truck. The operator may activate the inhibit switch for a variety or reasons. For example, the vehicle may be in a tunnel or other closed space such as a garage where it may be unsafe to generate the very high temperatures needed for burning off the soot.

The notification of regeneration could be in the form of an indication in the instrument panel located in the dashboard of the cab portion of the truck for example. While the notification via instrument panel on the dashboard may be adequate in some situations, it is not optimal or sufficient in other situations. Accordingly, in some embodiments, improved methods of notification are described.

SUMMARY

In one embodiment, a system for providing external notification of a vehicle event comprises: a reader device connected to a control unit providing status of at least one vehicle condition, the vehicle having a diesel particulate filter (DPF); a plurality of warning devices connected to the reader device; and a power supply connected to the reader device and the warning devices. The reader device receives data via data lines from the control unit, decodes the received data to detect the occurrence of a vehicle event relating to the DPF and controls ground signal lines of the warning devices to trigger at least one of the warning devices based on the detection of a particular type of vehicle event.

In another embodiment, a method for providing external notification of a vehicle event comprises: receiving data from a control unit; decoding the received data to detect occurrence of a vehicle event corresponding to a diesel particulate filter (DPF) regeneration; and triggering at least one of a plurality of external warning devices based on the detection of a particular type of vehicle event.

In a further embodiment, a truck with a diesel particulate filter (DPF) comprises: a reader device receiving data corresponding to vehicle conditions; a plurality of warning devices each having a ground signal connected to the reader device; and a power supply connected to the reader device and to each of the warning devices wherein the reader device decodes the received data to determine the occurrence of a vehicle event relating to the DPF and controls the ground signal lines of the warning devices to trigger at least one of the warning devices based on the detection of a particular type of vehicle event.

BRIEF DESCRIPTION OF THE DRAWINGS

The several features, objects, and advantages of applicants' invention will be understood by reading this description in conjunction with the drawings, in which.

DETAILED DESCRIPTION

Figure 1:
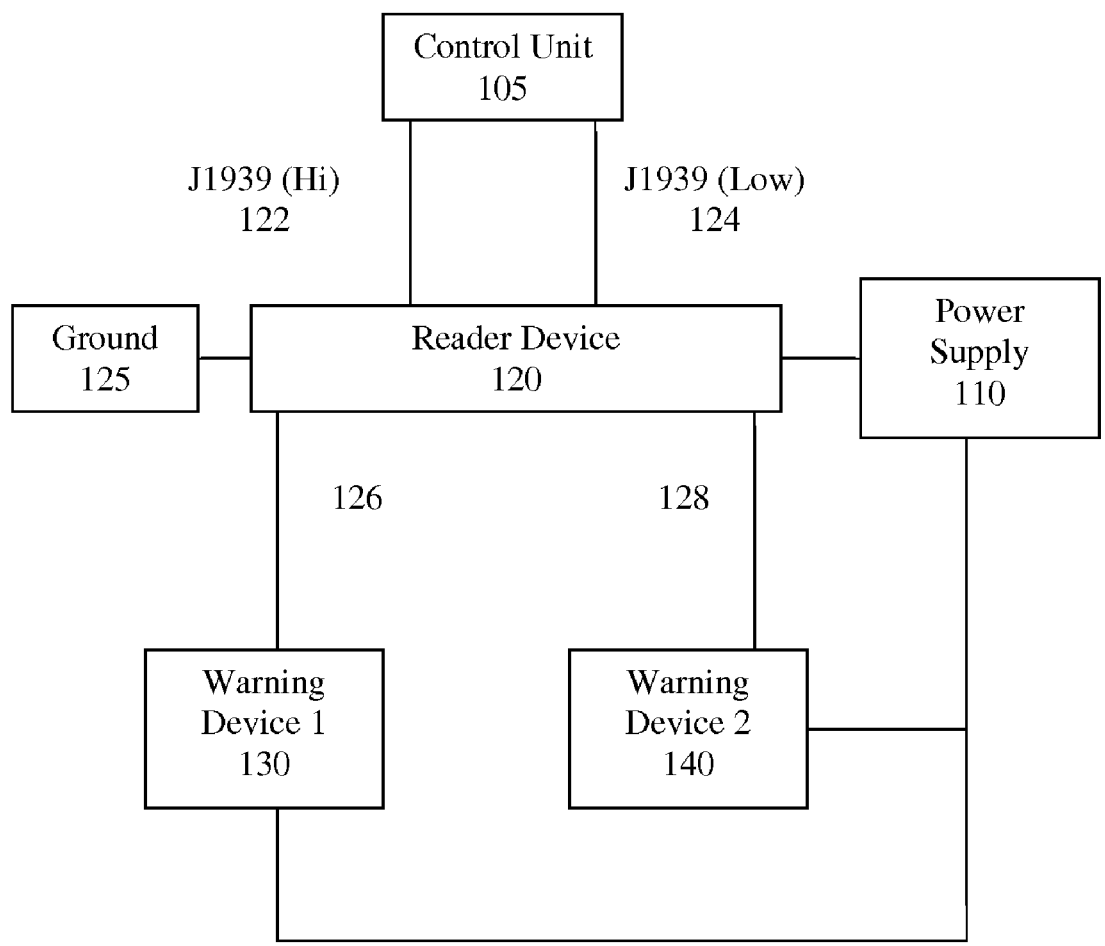
FIG. 1 illustrates a notification circuit in accordance with exemplary embodiments.

The following description of the implementations consistent with the present invention refers to the accompanying drawings. The same reference numbers in different drawings identify the same or similar elements. The following detailed description does not limit the invention. Instead, the scope of the invention is defined by the appended claims.

According to exemplary embodiments, a notification system is disclosed. The exemplary notification system may provide a warning or notification of a vehicle event to an operator of a truck that is outside of the truck. For purposes of this invention, the term "external" may refer to a location outside the truck (e.g. a cab portion). This notification may supplement a notification that may be provided in or by the instrument panel.

For active regeneration, the engine can be programmed to operate or run in a particular way so as to heat the exhaust to a high temperature of around 600° C. for example. The work required to heat the exhaust is performed by the engine.

An operator may be notified of the condition of the DPF and action to be taken. The action to be taken may be based on the DPF condition. For example, the operator may be notified that a regeneration is recommended when the soot level reaches a particular level (may refer to this as a first level for example). As the soot level on the DPF increases (may refer to this as a second level for example), the operator may be notified that a regeneration is needed. As the soot level increases further (may refer to this as a third level for example), the operator may be notified that a regeneration is required immediately. If each of these conditions or notifications are ignored and the level increases even further (may refer to this as a fourth level for example), the operator may be notified that the vehicle be stopped immediately for service.

In exemplary trucks such as those built by Mack® Trucks, the various notifications highlighted above may be referred to by a "level" designation. For example, the condition associated with the DPF as described above may be designated as "Level 1", "Level 2", "Level 3" and "Level 4" with Level 4 being more critical than Level 3 which is more critical than Level 2 which is more critical than Level 1.

The truck may be a cement dumper or a cement mixer for example. In operation, the cement dumper may be delivering cement to a third story of a building for example. At this time, the operator is typically outside the truck. Therefore, the notification provided via the instrument panel is not visible to the operator who is unaware of the need and level of regeneration. If the exhaust has to be heated for regeneration, the engine will reduce power to other functions being performed such as delivering the cement to the third floor and instead provide power for heating the exhaust. As a result, the cement delivery may cease or the cement may not reach the intended destination. This problem may also occur if the truck is operating in closed locations such as an underground garage or a tunnel, etc.

An exemplary notification circuit such as circuit 100 of FIG. 1 may provide the supplemental notification. Notification circuit 100 may include a power supply 110, a reader device 120, a first warning device 130 and a second warning device 140. The first warning device 130 may be a LED strobe lamp or a flashing lamp or similar visual device providing a visual signal. The second warning device 140 may be a horn or similar auditory device providing a sound. The power supply may be a 12 volt DC power supply. The warning devices may be located on an outside portion of the truck such as at the rear of the truck for example. Each warning device may correspond to a particular type of notification provided.

Reader device 120 may receive data from the engine electronic control unit (ECU) 105 of the vehicle via data lines 122 and 124. The engine ECU 105 may broadcast data (such as regeneration data) over a J1939 serial bus that is used in heavy duty trucks for example. The engine ECU provides information on vehicle condition and is known. Among the conditions on which the module provides information are status of the DPF and regeneration for example. The regeneration may be referred to herein as a vehicle event.

Reader device 120 may decode the data to determine various conditions associated with the vehicle. In exemplary embodiments, these conditions may include, for example, the status of the DPF and a notification of DPF regeneration (or vehicle event).

Reader device 120 receives power from power supply 110 and is connected to ground 125. Both the first and second warning devices 130 and 140 also receive power from power supply 110. The ground signals 126 and 128 of respective warning devices 130 and 140 may be controlled by reader device 120 to provide the corresponding notification.

If reader device 120 detects a particular notification or vehicle event, ground signal 126 of first warning device 130 may be controlled by the reader device to trigger the first warning device.

If reader device 120 detects another notification that is more critical, ground signal 128 of second warning device 140 may be controlled by the reader device to trigger the second warning device.

For the more critical notification, in exemplary embodiments, ground signal 126 of first warning device 130 may also be controlled simultaneously by the reader device to trigger the first warning device 130 (i.e. in addition to triggering the second warning device 140 for example). This may provide multiple simultaneous warnings.

Figure 2:
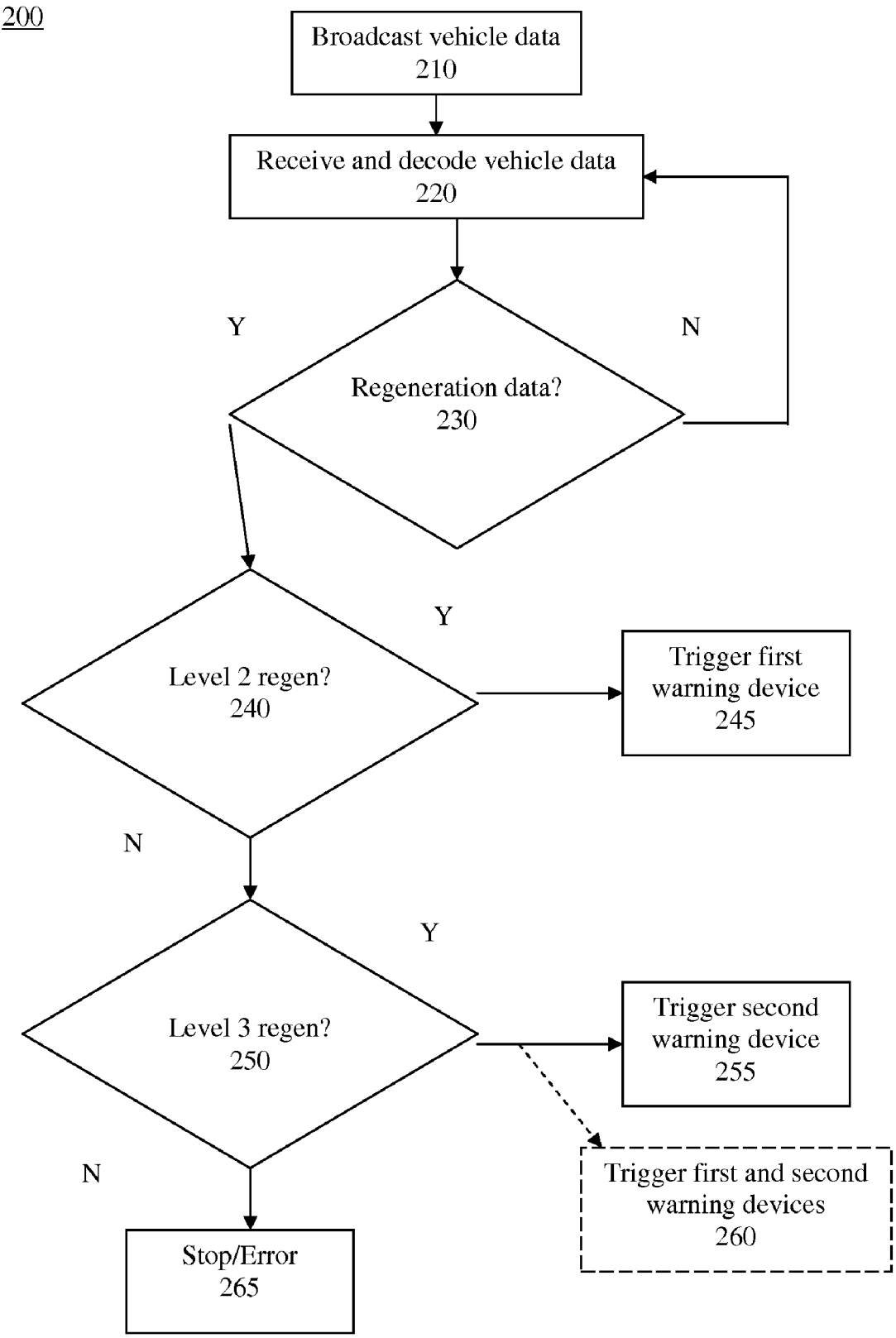
FIG. 2 illustrates a method in accordance with exemplary embodiments.

A method in accordance with exemplary embodiments may be described with reference to FIG. 2. An engine electronic control unit (ECU) may broadcast information on vehicle conditions over a J1939 serial bus, for example, at 210. A reader device may receive data over data lines and decode the received data at 220. The reader device may determine if a vehicle event corresponding to the DPF regeneration is detected at 230. If the DPF regeneration event is detected, a determination may be made as to the urgency level of the regeneration at 240 and 250 respectively.

Purely for illustrative purposes, using the exemplary designation of Mack trucks as described, a determination may be made as to whether the type of regeneration is a Level 2 or a Level 3 regeneration. If a Level 2 regeneration event is detected at 240, a first warning device may be triggered at 245. If a Level 3 regeneration event is detected at 250, a second warning device may be triggered at 255. In alternative embodiments, both first and second warning devices may be triggered at 260 with detection of a Level 3 regeneration.

It will be appreciated that the procedures (arrangement) described above may be carried out repetitively as necessary to perform vehicle maintenance. To facilitate understanding, many aspects of the invention are described in terms of sequences of actions. It will be recognized that the various actions could be performed by a combination of specialized circuits and mechanical elements.

The invention is not limited to implementation in vocational vehicles; it could be implemented in any vehicle utilizing a diesel particulate filter (DPF) with active regeneration. In addition, the invention is not limited to utilizing a J1939 serial bus for communicating data to the reader device. Other protocols for communicating vehicle data may be substituted for the J1939 protocol. The number and types of regeneration that can be detected/initiated may vary. The number and types of warning devices that could be used may also vary. In the exemplary embodiments described above, a warning device for each of the four levels may be included.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A system for providing notification of a vehicle event to an operator outside the vehicle, the system comprising:
   a reader device connected to a control unit via a plurality of data lines, the control unit providing status of at least one vehicle condition wherein the vehicle is equipped with a diesel particulate filter (DPF);
   a plurality of warning devices connected to the reader device; and
   a power supply connected to the reader device and to the warning devices, wherein the reader device:
   receives data from the control unit;
   decodes the received data to detect the occurrence of a vehicle event relating to the DPF; and
   controls ground signal lines of the warning devices to trigger at least one of the warning devices based on the detection of a particular event.

2. The system of claim 1, wherein the data received from the control unit corresponds to vehicle conditions including the status of the DPF.

3. The system of claim 1, wherein the vehicle event is a regeneration of the DPF.

4. The system of claim 1, wherein a first one of the plurality of warning devices provides a visual warning.

5. The system of claim 1, wherein a second of the plurality of warning devices provides an auditory warning.

6. The system of claim 3, wherein the regeneration has one of a first urgency level and a second higher urgency level.

7. The system of claim 6, wherein the first urgency level regeneration triggers a first one of the plurality of warning devices to provide a warning signal.

8. The system of claim 6, wherein the second urgency level regeneration triggers a second one of the plurality of warning devices to provide a warning signal.

9. The system of claim 6, wherein the second urgency level regeneration triggers a first and a second one of the plurality of warning device to provide respective warning signals.

10. The system of claim 1, wherein ground signal lines of a first and a second one of the plurality of warning devices are controlled by the reading device to trigger a corresponding warning signal.

11. The system of claim 1, wherein a first and a second one of the plurality of warning devices are located at an external portion of the vehicle.

12. The system of claim 1, wherein the control unit is an engine electronic control unit (ECU).

13. A method of providing external notification of a vehicle event to an operator of the vehicle, the method comprising:
receiving of data by a reader device from a control unit via a plurality of data lines;
decoding the received data to detect occurrence of a vehicle event corresponding to a diesel particulate filter (DPF) regeneration; and
triggering at least one of a plurality of external warning devices based on a type of detected regeneration.

14. The method of claim 13, wherein the data is received by a reader device from an engine electronic control unit (ECU) of a truck.

15. The method of claim 13, wherein the type of detected regeneration is one of a first urgency level regeneration and a second higher urgency level regeneration.

16. The method of claim 15, further comprising:
triggering a plurality of warning devices if the detected regeneration is the higher urgency level regeneration.

17. A vehicle having a diesel particulate filter (DPF), the vehicle comprising:
a reader device receiving data corresponding to vehicle conditions from a control unit via a plurality of data lines;
a plurality of external warning devices each having a ground signal line connected to the reader device; and
a power supply connected to the reader device and to each of the warning devices wherein the reader device decodes the received data to detect the occurrence of a vehicle event relating to the DPF and controls the ground signal lines of the warning devices to trigger at least one of the warning devices based on the detection of a particular event.

18. The truck of claim 17, wherein the warning devices are located on an external portion of the truck.

19. The truck of claim 18, wherein the external portion is a rear portion of the truck.

20. The truck of claim 17, wherein the warning devices provide at least one of a visual and an auditory warning signal.

* * * * *